(12) United States Patent
Srivastav et al.

(10) Patent No.: US 10,050,947 B2
(45) Date of Patent: Aug. 14, 2018

(54) KEY DISTRIBUTION IN A DISTRIBUTED NETWORK ENVIRONMENT

(71) Applicant: Cisco Technology, Inc., San Jose, CA (US)

(72) Inventors: Vivek S. Srivastav, Suwanee, GA (US); Jeffrey M. Seaman, Lilburn, GA (US); Timothy C. Richards, Cumming, GA (US); Andrew D. Maholski, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 15/008,694

(22) Filed: Jan. 28, 2016

(65) Prior Publication Data

US 2017/0222981 A1 Aug. 3, 2017

(51) Int. Cl.
*H04L 29/06* (2006.01)
*H04L 9/32* (2006.01)
*G06F 9/455* (2018.01)

(52) U.S. Cl.
CPC ........ *H04L 63/062* (2013.01); *G06F 9/45558* (2013.01); *H04L 9/3263* (2013.01); *H04L 9/3268* (2013.01); *H04L 63/0428* (2013.01); *H04L 63/08* (2013.01); *G06F 2009/45587* (2013.01)

(58) Field of Classification Search
CPC .................................................. H04L 63/062
See application file for complete search history.

(56) References Cited

U.S. PATENT DOCUMENTS

| 9,118,487 | B1* | 8/2015 | Robinson | .............. H04L 9/3268 |
| 9,536,065 | B2* | 1/2017 | Bouse | |
| 2006/0041761 | A1* | 2/2006 | Neumann | .............. G06F 21/32 |
| | | | | 713/189 |

(Continued)

OTHER PUBLICATIONS

Nicholas Dille, "How to Remotely Prepare a Virtual Machine for #PSDSC Pull Mode", http://dille.name/blog/2015/01/20/how-to-remotely-prepare-a-virtual-machine-for-psdsc-pull-mode/ . . . , downloaded from the internet on Nov. 5, 2015, 4 pages.

(Continued)

*Primary Examiner* — Bradley Holder
(74) *Attorney, Agent, or Firm* — Edell, Shapiro & Finnan, LLC

(57) ABSTRACT

A system including a controller and a pool of computing resources to run virtual machines are configured to automatically provision each virtual machine with unique cryptographic constructs. The controller receives a request to instantiate a virtual machine based on an image/template. The controller determines an authentication credential for a registration authority that the virtual machine will use. The controller determines the computing resources to run the virtual machine, and instructs the computing resources to boot the virtual machine. The controller passes the authentication credential to the virtual machine. After receiving the authentication credential, the virtual machine authenticates the registration authority and sends a request for the cryptographic constructs. The virtual machine securely receives the cryptographic constructs from the registration authority, enabling the virtual machine to securely communicate with other computing entities.

20 Claims, 6 Drawing Sheets

(56) References Cited

U.S. PATENT DOCUMENTS

| | | | |
|---|---|---|---|
| 2009/0222674 A1* | 9/2009 | Leichsenring | G06F 21/51 |
| | | | 713/193 |
| 2013/0318343 A1* | 11/2013 | Bjarnason | H04L 41/0809 |
| | | | 713/157 |
| 2015/0215308 A1* | 7/2015 | Manolov | H04L 63/0823 |
| | | | 709/229 |
| 2017/0161505 A1* | 6/2017 | Campagna | G06F 9/45558 |

OTHER PUBLICATIONS

M. Pritikin et al., "Enrollment over Secure Transport", Internet Engineering Task Force (IETF), ISSN: 2070-1721, Oct. 2013, 53 pages.

* cited by examiner

KEY DISTRIBUTION IN A DISTRIBUTED NETWORK ENVIRONMENT

TECHNICAL FIELD

The present disclosure relates to security mechanisms in scalable computer networks.

BACKGROUND

Communications between various computing entities in an untrusted network are typically secured using Transport Layer Security (TLS) encryption, requiring public key infrastructure (PKI) support. PKI support may include public/private key pairs as well as signed digital certificates that are linked back to an entity trusted by both parties in the communication. Each computing entity or service component maintains its unique private key in secret, and any separate entity that becomes aware of the particular private key (i.e., if the private key is compromised) provides an attack surface into the computing entity's communications.

In a cloud environment, virtual machines may be transient and instances may be booted to scale with demand for the service provided by that virtual machine. Rather than manually provision each instance with an individual digital certificate, each instance of the virtual machine may be provided with PKI support by replicating the keys and certificate in the virtual machine image used to create each instance. Alternatively, some cloud environments may use a hardware based trust anchor.

DESCRIPTION OF EXAMPLE EMBODIMENTS

Overview

A method is provided for a virtual machine to securely obtain cryptographic material needed to set up subsequent secure communications channels. The method comprises receiving an authentication credential associated with a registration authority from a controller. The registration authority is configured to provide cryptographic material. The virtual machine generates cryptographic keys, authenticates with the registration authority based on the authentication credential and sends a request for cryptographic material to the registration authority. The request for cryptographic material includes the authentication credential. The virtual machine securely receives the cryptographic material from the registration authority.

DETAILED DESCRIPTION

Services running in an untrusted domain use a method to secure interfaces. Transport Layer Security (TLS) encryption may use public key infrastructure (PKI) support, particularly when services are hosted in an untrusted environment. An example of an untrusted environment is a video services and solutions offering, which may be deployed and managed within a third party's private data center environment.

In such a deployment environment, attack surfaces may be minimized by having the client and services support TLS, which uses private keys, signed digital certificates, and trust stores. Traditional mechanisms for provisioning these certificates, such as by manually providing them, present a challenge in a cloud environment where virtual machine instances may be transient and auto-scaling support is required. Since the certificate deployment and management procedures are complex, an Enrollment over Secure Transport (EST) protocol was developed (e.g., in The Internet Engineering Task Force Request for Comments 7030) to provide for automatic enrollment.

The techniques presented herein leverage the EST protocol to bootstrap virtual machines hosting client and service processes with a set of instance-specific PKI keys and certificates. These instance-specific key and certificates enable clients and services to communicate with each other in a secure fashion. Also presented herein are mechanisms to generate authorizations to specific service instances for third parties.

This bootstrapping of keys and digital signatures, as well as provisioning of the client and server trust store, provide automatic scaling support when a solution is deployed in an unsecured third party data center. Additionally, the techniques presented herein enable development teams to focus on core business problem solving functionality, since it relegates security concerns to the bootstrapping process. In particular, the techniques presented herein leverage standard mutual certificate-based TLS/HTTPS security implementation, which is often already supported in web and application containers.

Figure 1:
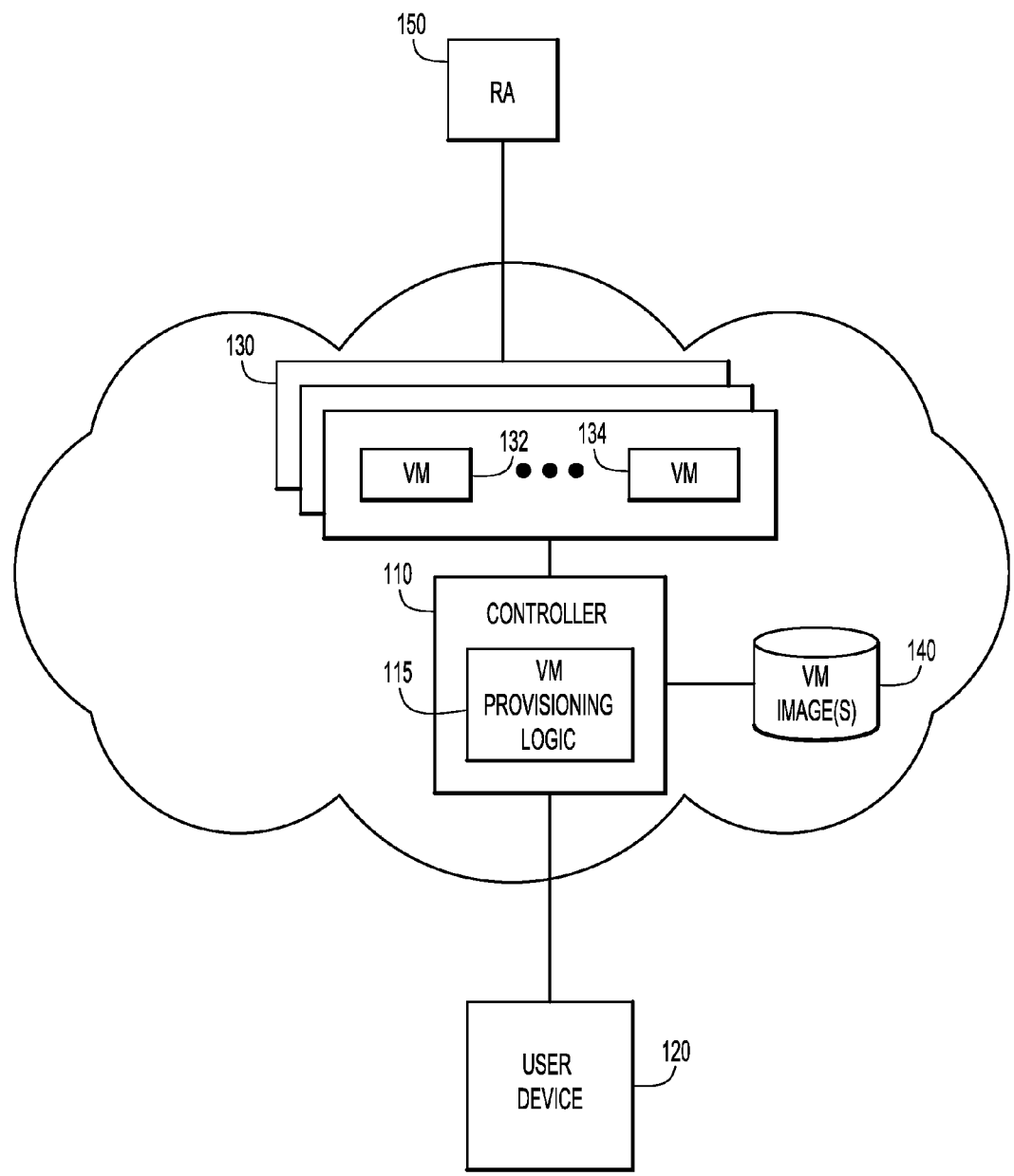
FIG. 1 is a block diagram illustrating a system for securely instantiating virtual machines, according to an example embodiment.

Referring now to FIG. 1, a system block diagram illustrates an example of a system to instantiate virtual machines and automatically provision the virtual machines with cryptographic material needed to support secure communications. A cloud network system 100 includes at least one controller 110 that is tasked with setting up virtual machines using virtual machine provisioning logic 115. A user device 120 communicates with the controller 110 to request a virtual machine be instantiated and provisioned with credentials needed to secure network communications, e.g., with user device 120 or with other virtual machines.

The controller 110 selects appropriate computing resources 130 (e.g., processors, memory, network interfaces, etc.) to run the virtual machine. The computing resources 130 may run a plurality of virtual machines, such as virtual machines 132 and 134. A virtual machine 132 may be based on a virtual machine image 140, which may be stored in an image database in the cloud network system 100. The image database may be stored in memory of the controller 110 or in a separate database in the cloud network 100. Each of the virtual machines 132 and 134 can communicate with a registration authority (RA) 150 to obtain cryptographic material, such as keys and certificates, used in secure communication channels. The registration authority 150 may be running on another virtual machine within the cloud network system 100.

In one example, the controller 110 uses an OpenStack Heat template to launch the virtual machines in an organized and scalable manner. After a virtual machine 132 is bootstrapped, it communicates securely with the registration authority 150 to request PKI support. The controller 110 passes an authentication credential (e.g., a shared password, userID/password, one-time password, certificate, etc.) to the virtual machine to provide a trust anchor between the virtual machine 132 and the registration authority 150. The authentication credential allows the virtual machine 132 and registration authority 150 to establish a secure connection over which the virtual machine 132 can request PKI support.

In another example, the registration authority 150 comprises an Enrollment over Secure Transport (EST) server to process the request from an EST client on the virtual machine 132. By using an EST client on the virtual machine 132 to obtain keys and certificates, the controller 110 never stores the cryptographic material that is unique to the virtual machine 132. The registration authority may include components (e.g., an EST server, a certificate authority, etc.) that may be co-located or connected across a computer network (e.g., Local Area Network, Wide Area Network, etc.).

Figure 2:
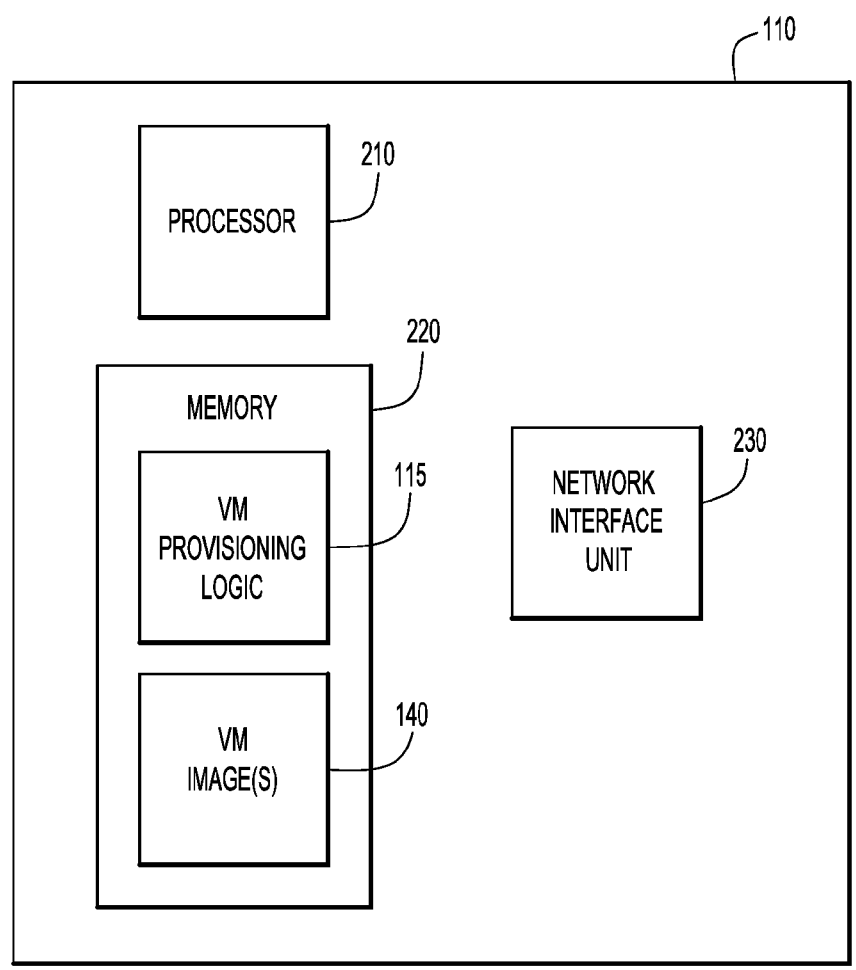
FIG. 2 is a simplified block diagram of a controller device that may be configured to perform the methods presented herein, according to an example embodiment.

Referring now to FIG. 2, an example block diagram of a controller device 110 is shown. The controller 110 includes, among other possible components, a processor 210 to process instructions relevant to instantiating virtual machines (e.g., determining appropriate computing resources, providing authentication credentials, etc.), and a memory 220 to store a variety of data and software instructions (e.g., virtual machine provisioning logic 115, virtual machine images 140, etc.). The controller 110 also includes a network interface unit 230 to communicate with other computing devices and computing resources over computer networks.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
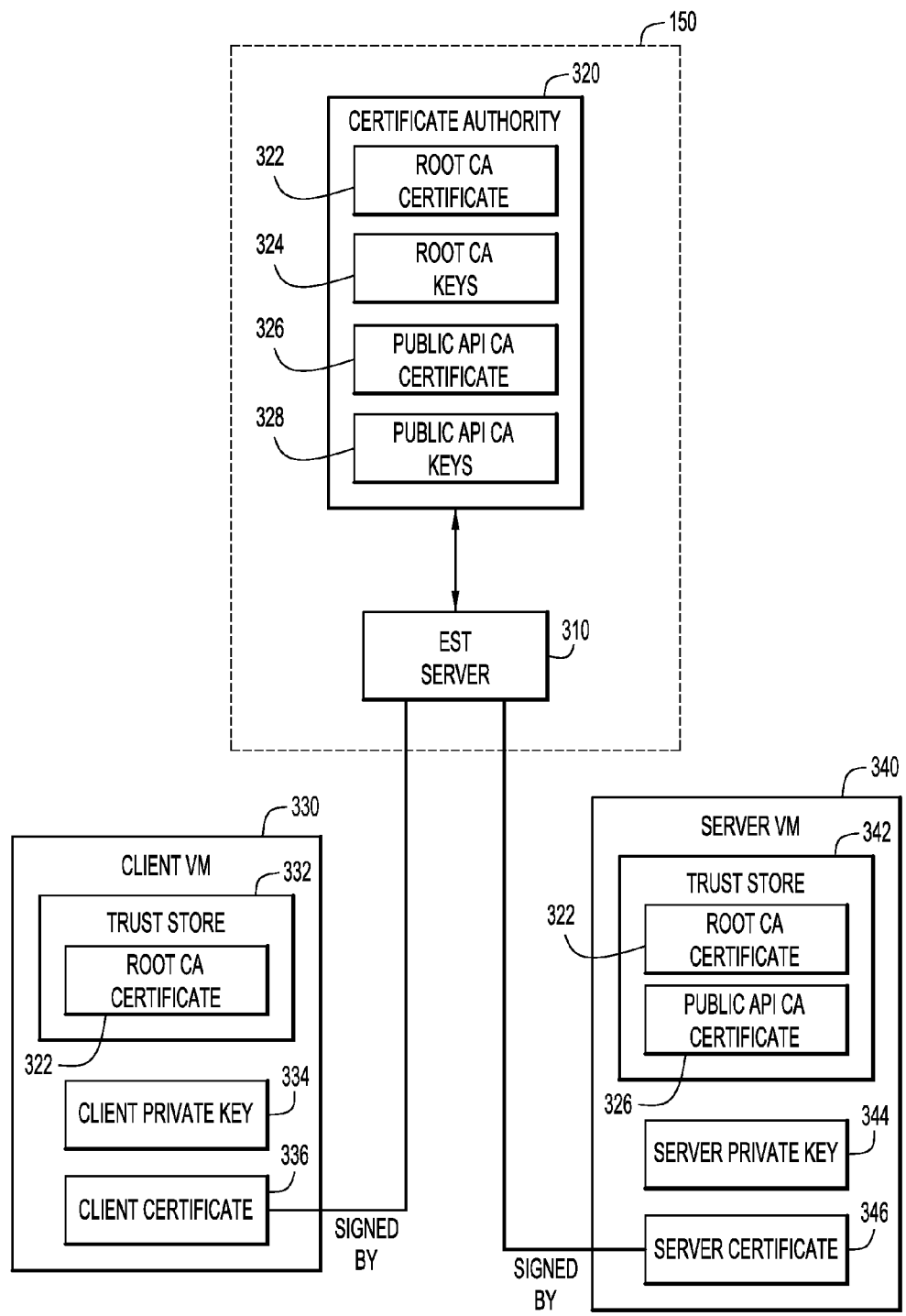
FIG. 3 is a high level system diagram showing the flow of trust in accordance with a method presented herein.

Referring now to FIG. 3, a simplified block diagram is shown for a system including a client virtual machine and a service virtual machine, as well as the trust mechanism used to secure communications between the two virtual machine instances. The registration authority 150 includes an EST server 310 that handles requests from virtual machines for PKI support through the EST protocol. The EST server 310 is connected to a root certificate authority (CA) 320 that serves as a trusted third party for the virtual machines. In one example, the CA 320 may be provided by a customer, and is distinct from the registration authority 150. The customer-provided CA 320 and the registration authority 150 are presumed to have a pre-established trust relationship. The CA 320 stores root CA certificates 322 linked to the root CA keys 324. Additionally, a public Application Programming Interface (API) CA may be chained to the root CA 320 by storing the Public API CA certificates 326 and public API CA keys 328. In other words, the public API CA certificates 326 may be signed by one of the root CA keys 324. In one example, the certificate authority 320 may support multiple tenants using multiple roots. Each Public API CA (pair of 326 & 328) maps to a unique API name for identification and used for enabling appropriate entitlement constructs in Client certificate 336.

The client virtual machine 330 establishes a secure connection with the registration authority 150 (e.g., using the authentication credentials passed to it during the launch process of the virtual machine as further described hereinafter) and requests cryptographic material for secure transport. The registration authority 150 sends the root CA certificate 322 to the client virtual machine 330, which stores it in its trust store 332. The registration authority 150 also generates and sends a client private key 334 and client certificate 336 that the client virtual machine 330 stores for use in setting up secure communication channels. The client private key 334 is the private portion of a public/private key pair associated with the client virtual machine 330. In another example, the client virtual machine 330 may generate its own client private key 334 as part of a PKI key pair, and create a certificate signing request. The certificate signing request is sent to the registration authority 150, which responds with a signed client certificate 336.

Similar to the client virtual machine 330, the server virtual machine 340 establishes a connection with the registration authority 150 and requests cryptographic material for secure transport. The registration authority sends the root CA certificate 322 and the Public API CA certificate 326 to the server virtual machine 340, which stores them in its trust store 342. The registration authority 150 also generates and sends a server private key 344 and server certificate 346 that the server virtual machine 340 stores for use in setting up secure communication channels. The server private key is a private portion of a public/private key pair associated with the server virtual machine 340. In another example, the server virtual machine 340 may generate its own server private key 344, and request that the registration authority sign the related server certificate 346.

In one example, the client certificate 336 includes authorization constructs that enable the client virtual machine 330 to access one or more APIs exposed on server virtual machines, such as the server virtual machine 340. This distinguishes the client certificate 336 from the server certificate 346 and also supports client authorization in an environment where client virtual machines may have different entitlement characteristics. A client-specific certificate 336 enables the ability to create specific client-server trusts based on APIs for which the client virtual machine 330 should be authorized.

In one example, FIG. 3 shows the configuration of client and server instances of virtual machines. The client virtual machine instance 330 stores a generated private key 334 (e.g., generated according to a Rivest, Shamir, Adleman (RSA) algorithm) and a signed digital signature certificate 336, which is obtained through dynamic enrollment with EST server 310. Additionally, the trust store 332 may be provisioned during the virtual machine security bootstrapping. The trust store 332 in the client virtual machine instance 330 stores the root CA certificate 322 used to validate communications channels using a mutual certificate based Transport Layer Security (TLS) session. In particular, the client virtual machine 330 may validate a TLS connection to the server virtual machine 340 using the mutual certificate based TLS session.

The server virtual machine instance 340 similarly stores a generated RSA private key 344 and a signed digital certificate 346, which is obtained through dynamic enrollment with the EST server 310. In addition to the techniques presented herein, the server virtual machine 340 may be provisioned during a virtual machine bootstrap with appropriate keys in the server trust store 342. The server trust store 342 may store the root CA certificate 322 and a Public API CA certificate 326. The Public API CA certificate 326 enables the server virtual machine 340 to support both private clients (e.g., with the root CA certificate 322) as well as clients with certificates that chain to a Public API certificate authority.

In another example, a third party client may obtain a certificate from the registration authority 150 via a Web User Interface (WUI) signed by a Public API certificate authority. Each public interface may require its own chain of trust, i.e., a Public API certificate authority.

In one use case scenario, the certificates may be distributed throughout a customer's enterprise cloud network according to the following steps. Initially, an operator installs a certificate authority (e.g. CA 320) in the customer's enterprise cloud network. The certificate authority will provide the basis for dynamic certificate enrollment for bootstrapping operator-provided solution services as well as client virtual machine instances. An administrator generates a private root CA for the operator's services enrollment. For each API interface access that may be made available to third parties otherwise exposed in the customer's environment, the administrator creates an API name identifier (e.g., a human readable name) and generates an API CA root. A customer administrator access a web user interface, selects one or more APIs (e.g., by API name), and submits a Certificate Signing Request (CSR). The CSR is submitted to generate a certificate for enabling access to the specified APIs.

In one example, a bootstrapping utility (e.g. OpenStack Heat Template) operating on an administrative node in the customer's cloud network enables a newly instantiated virtual machine to perform certificate enrollment using the EST protocol. The bootstrapping utility provides queries to obtain the Private Root CA certificate and API-specific CA root certificates via an API. The administrator provides a web user interface to download the root CA certificate and API-specific certificates. This mechanism may be used to construct the trust stores 332 and 342 on the client virtual machine 330 and the server virtual machine 340, respectively. These trust stores provides a means for client and server to trust each others certificates based on their certificate chain for mutual certificate based TLS. In another example, a bootstrapping utility may, based on the configuration parameters passed, perform the virtual-machine-specific trust store configuration by accessing the Root CA certificate or API specific certificates from an administrator web interface provided for this purpose. The bootstrapping utility may be included in the virtual machine image 140 or it may be installed by the controller 110 on the virtual machine 330 or 340 during the virtual machine launch process.

Figure 4:
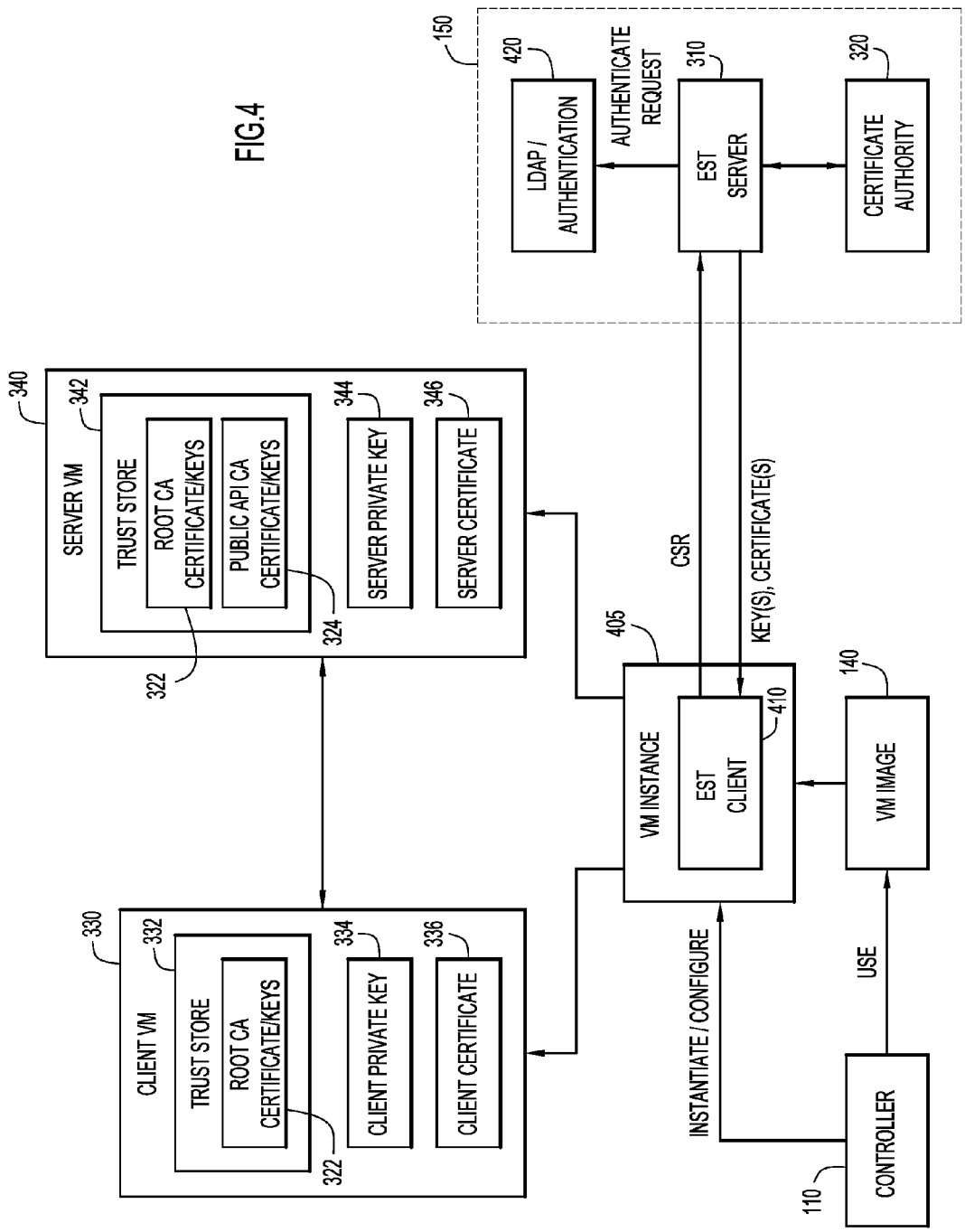
FIG. 4 is a system diagram illustrating a controller instantiating virtual machines and the virtual machines obtaining cryptographic material, according to an example embodiment.

Referring now to FIG. 4, a simplified block diagram shows a controller bootstrapping virtual machine instances configured to be securely provisioned with cryptographic material. The controller 110 uses a virtual machine image 140 as a template to bootstrap a virtual machine instance 405. The virtual machine instance 405 may be, for example, a client virtual machine 330 or a server virtual machine 340, as described with respect to FIG. 3.

The virtual machine instance 405 includes an embedded EST client 410 that discovers the EST Server 310 after startup. The EST client 410 may be provisioned with the address of the EST server 310, e.g., as part of the virtual machine image 140. Alternatively, the address of the EST server 310 may be passed to the EST client 410 as an environment variable, e.g., configured as a system parameter during the bootstrapping procedure by the controller 110. In another example, the EST server 310 may be registered in a Domain Name Service (DNS) with a well defined host name.

The controller 110, which is used to launch the virtual machine instance 405, and the EST server 310, share a trust anchor, e.g., through authentication credentials. As used herein, a trust anchor refers to an authentication mechanism that the registration authority 150 uses to authenticate the EST client 410 that runs on the virtual machine 405. The authentication credentials may include a shared password, a userID/password combination, a one-time-password, or digital certificates. The controller 110 passes the authentication credentials to the virtual machine instance 405, which uses the authentication credentials to request PKI support from the EST server 310.

In one example, the request for PKI support comprises a Certificate Signing Request (CSR) using the EST protocol. The request may include the authentication credentials, an unsigned digital certificate related to a generated private key, and/or an indication of a specific API for which the virtual machine will require the signed certificate to be authorized. The EST server 310 may authenticate the request using a Lightweight Directory Access Protocol (LDAP) or authentication server 420. Alternatively, the authentication mechanism may be provided within the EST server 310. In another example, the registration authority 150 supports a plugin based authentication mechanism. Additionally, the registration authority may support open source authentication methods, e.g., OAuth, Keycloak server, etc., and may include federated authentication, e.g., with social media or email platforms.

After the request is authenticated, the EST server 310 obtains a signed digital certificate (e.g., client certificate 336) from the certificate authority 320. The EST server 310 sends the signed digital certificate to the virtual machine instance 405 through the secure connection to the EST client 410. In one example, the EST server 310 sends additional certificates and/or keys for the virtual machine 405 to store in a trust store. In another example, the registration authority 150 may generate a cryptographic key (e.g., a public/private key pair) for the virtual machine 405, and send the key directly to the virtual machine 405, maintaining the privacy of the private key from the controller 110.

In one example, the EST server 310 provides TLS security for the communication between the EST client 410 in the newly instantiated virtual machine 405 and the registration authority 150. The authentication credentials that the controller passes to the virtual machine instance 405 in the bootstrapping process allow for various mechanisms for authenticating a client request over a server-based TLS mechanism. The authenticated channel from the virtual machine 405 and the registration authority 150 enables a secure mechanism to generate a key pair, prepare a CSR, and enroll the certificate from within the virtual machine 405. This allows for unique key/certificate provisioning without any other computing entity discovering the cryptographic material that the virtual machine 405 will later use to securely communicate with other computing entities.

In another example, the EST client 410 may track and perform certificate re-registration if a certificate (e.g., client certificate 336) expires. This enables auto-renewal of the certificates.

Figure 5:
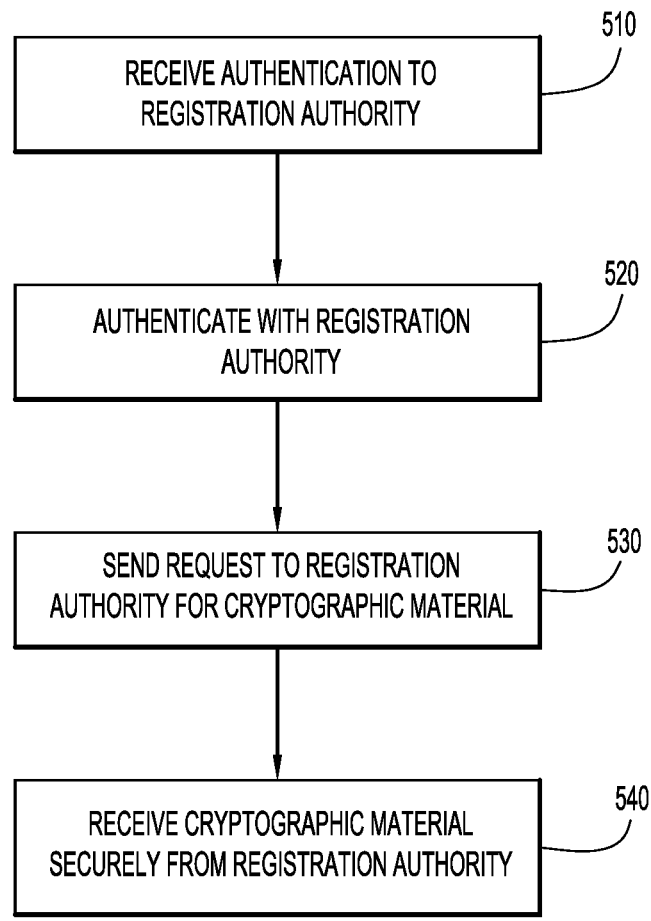
FIG. 5 is flowchart illustrating operations of a virtual machine in securely obtaining cryptographic material, according to an example embodiment.

Referring now to FIG. 5, a flowchart illustrates operations performed by a newly bootstrapped virtual machine in automatically being provisioned for secure communications. In step 510, the virtual machine receives authentication credentials to a registration authority. The authentication credentials may be part of the virtual machine image from which the virtual machine was created. Alternatively, the authentication credentials may be passed to the virtual machine from an administrative node that ran the bootstrapping procedure to instantiate the virtual machine. In step 520, the virtual machine authenticates the registration authority to ensure that the registration authority is authorized to provide secure cryptographic material. In one example, the registration authority may provide a signed digital certificate for a root certificate authority.

In step 530, the virtual machine sends a request to the registration authority for cryptographic material. The request will include the authentication credentials to authenticate the virtual machine as authorized to be serviced by the registration authority. In one example, the request comprises a Certificate Signing Request. In step 540, the virtual machine receives the requested cryptographic material securely form the registration authority. The cryptographic material may comprise one or more of a signed digital certificate for the virtual machine, a public/private key pair for the virtual machine, or keys/certificates of root certificate authorities associated with the registration authority.

Figure 6:
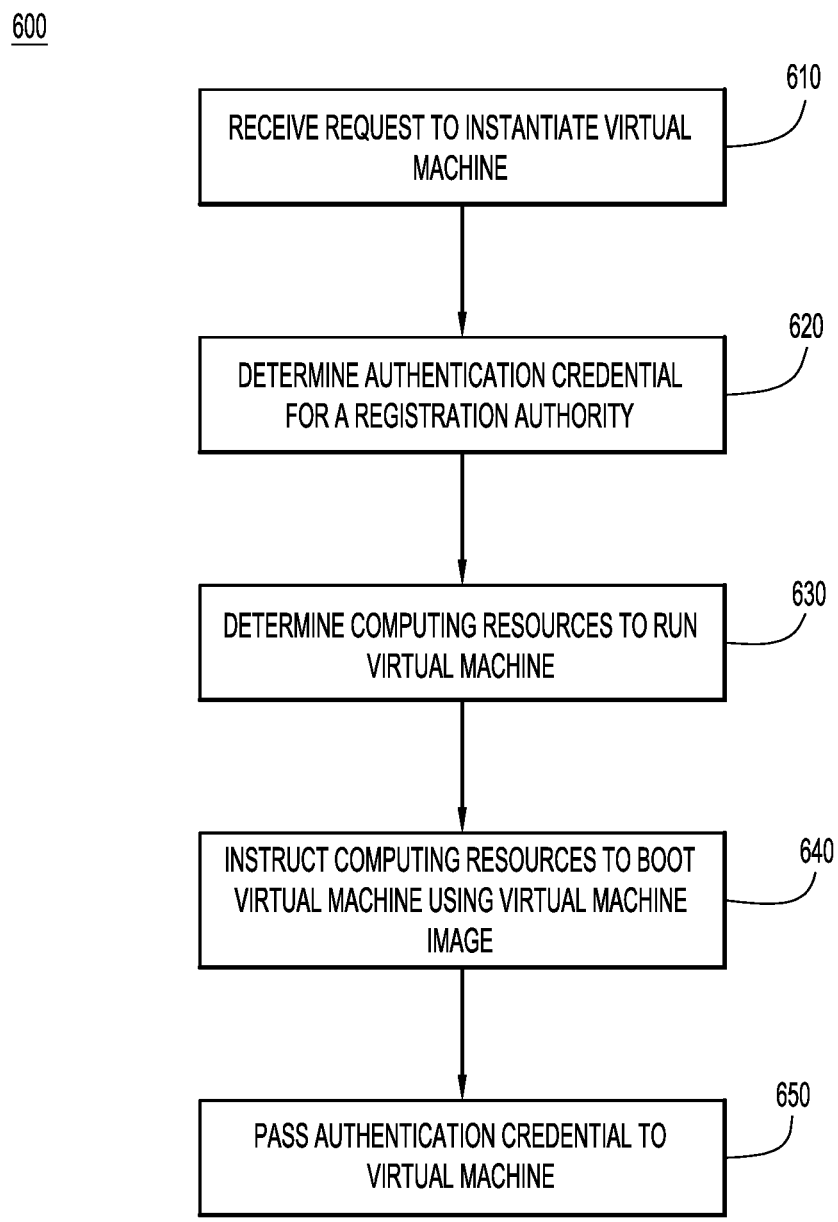
FIG. 6 is flowchart illustrating operations of a controller device in securely setting up a virtual machine to obtain cryptographic material, according to an example embodiment.

Referring now to FIG. 6, a flowchart illustrates operations performed by a controller in provisioning a virtual machine for secure communications. In step 610, the controller receives a request to instantiate a virtual machine. The request may be received as a result of an auto-scaling process to handle additional demand on a cloud based service. In step 620, the controller determines an authentication credential that the virtual machine with a registration authority. The authentication credential may include a password, certificate, or other means of authentication. The controller determines computing resources that will be used to run the virtual machine in step 630. The computing resources may include, for example, one or more processors, memory, storage, and network interfaces. The controller may determine the appropriate computing resources based on the processes that the virtual machine will be expected to operate.

In step 640, the controller instructs the computing resources to bootstrap the virtual machine using a virtual machine image. The controller may obtain the virtual machine image from a database coupled to the controller. In another example, the virtual machine image or an indicator of the virtual machine image may accompany the request to instantiate the virtual machine. In step 650, the controller passes the authentication credential to the virtual machine, allowing the virtual machine to securely communicate with the registration authority without the controller. The authentication credential may be passed to the virtual machine as part of the virtual machine image or as an environment variable that the controller configures during the bootstrapping process. The authentication credential enables the virtual machine to securely request and receive cryptographic material from the registration authority. The cryptographic material allows the virtual machine to set up secure communication channels with other computing entities, e.g., other physical or virtual machines.

In one example, the controller may install a certificate bootstrapping utility that generates an RSA key pair and creates a certificate signing request based on the generated key pair. The bootstrapping utility may additionally perform other EST client functions after the launch of the virtual machine to prepare the virtual machine for certificate enrollment. Alternatively, the certificate bootstrapping utility may be part of the virtual machine image used to instantiate the virtual machine. The bootstrapping utility may leverage the EST client and perform functions beyond the EST client's typical involvement in certificate enrollment and re-enrollment, such as construction of trust stores. The bootstrapping utility may further wrap the keys and trust stores with a passphrase and interface with applications to provide them access to certificates and trust stores to improve the overall security of the solution.

In summary, the techniques presented herein provide for a service-to-service security model and certificate provisioning mechanism for solutions that need to support a cloud environment where client and service virtual machines are created dynamically and require certificate management. The automatic provisioning of certificates to dynamically generated virtual machines solves the certificate distribution challenge and securely provides a unique certificate to each virtual machine. The implementation of business function provided by the virtual machines are abstracted from security mechanisms needed to secure the virtual machines, enabling development teams to focus on the business functionality without devoting time to the security concerns. Additionally, this solution does not compromise security of the cryptographic material and does not assume or require a trusted environment to provide automatic scaling.

In one form, a method is provided for a virtual machine to securely obtain cryptographic material needed to set up subsequent secure communications channels. The method comprises receiving an authentication credential associated with a registration authority from a controller. The registration authority is configured to provide cryptographic material. The virtual machine authenticates the registration authority base don the authentication credential and sends a request for cryptographic material to the registration authority. The request for cryptographic material includes the authentication credential. The virtual machine securely receives the cryptographic material from the registration authority.

In another form, a method is provided for a controller to instantiate a virtual machine and enable the virtual machine to obtain cryptographic material needed to set up subsequent secure communications channels. The method comprises receiving a request to instantiate a virtual machine based on a virtual machine image. The controller determines an authentication credential for a registration authority configured to provide cryptographic material. The controller also determines computing resources to run the virtual machine. The controller instructs the computing resources to boot the virtual machine using the virtual machine image, and passes the authentication credential for the registration authority to the virtual machine. The authentication credential enables the virtual machine to authenticate the registration authority and securely receive cryptographic material form the registration authority.

In yet another form, a system is provided for instantiating and provisioning a virtual machine and enabling the virtual machine to obtain cryptographic constructs needed to set up subsequent secure communications channels. The system comprises a controller and one or more processors configured to run the virtual machine. The controller is configured to receive a request to instantiate a virtual machine based on a virtual machine image. The controller is also configured to determine an authentication credential for a registration authority that is configured to provide the cryptographic constructs. The controller is further configured to determine computing resources to run the virtual machine and instruct the computing resources to boot the virtual machine using the virtual machine image. The controller is also configured to pass the authentication credential for the registration authority to the virtual machine. The one or more processors are configured to run the virtual machine by receiving the authentication credential form the controller and authenticating the registration authority based on the authentication credential. The one or more processors are also configured to send a request for the cryptographic constructs to the registration authority. The request for the cryptographic constructs includes the authentication credential. The one or more processors are further configured to receive the cryptographic constructs securely from the registration authority.

The above description is intended by way of example only. Various modifications and structural changes may be made therein without departing from the scope of the concepts described herein and within the scope and range of equivalents of the claims.

What is claimed is:

1. A method comprising:
   at a computing device running a service virtual machine:
   receiving an authentication credential from a controller, the authentication credential securing communication with only a registration authority providing cryptographic material;
   authenticating the registration authority based on the authentication credential;
   sending a request for cryptographic material to the registration authority, the request comprising the authentication credential;
   securely receiving the cryptographic material from the registration authority; and
   establishing a secure communication channel with at least one of a plurality of other computing entities based on the cryptographic material.

2. The method of claim 1, further comprising:
   establishing the secure communication channel with a client virtual machine based on the cryptographic material; and
   providing a service to the client virtual machine over the secure communications channel.

3. The method of claim 1, wherein the cryptographic material comprises a digital certificate and a public/private key pair.

4. The method of claim 3, wherein the registration authority comprises an Enrollment over Secure Transport server and a certificate authority server, the certificate authority server generating the digital certificate and the public/private key pair.

5. The method of claim 4, wherein a public certificate authority is chained to the registration authority.

6. The method of claim 1, wherein the request for cryptographic material is sent to the registration authority at an address that is registered with a domain name service having a well defined host name.

7. The method of claim 1, further comprising receiving an address of the registration authority from the controller.

8. A method comprising:
   at a controller device with controller logic:
   receiving a request to instantiate a virtual machine based on a virtual machine image;
   determining an authentication credential for the virtual machine to authenticate only a registration authority, the registration authority providing cryptographic material utilized in securing communications between the virtual machine and a plurality of other computing entities;
   determining computing resources to run the virtual machine;
   instructing the computing resources to boot the virtual machine using the virtual machine image; and
   passing the authentication credential for the registration authority to the virtual machine enabling the virtual machine to authenticate the registration authority and securely receive cryptographic material from the registration authority, wherein the cryptographic material enables the virtual machine to securely communicate with a plurality of other computing entities.

9. The method of claim 8, wherein the cryptographic material comprises a digital certificate and a public/private key pair.

10. The method of claim 9, wherein the registration authority comprises an Enrollment over Secure Transport server and a certificate authority server, the certificate authority server generating the digital certificate and the public/private key pair.

11. The method of claim 8, further comprising:
    receiving a new request to instantiate a new virtual machine based on a different virtual machine image;
    determining new computing resources to run the new virtual machine;
    instructing the new computing resources to boot the new virtual machine using the different virtual machine image; and
    passing the authentication credential for the registration authority to the new virtual machine enabling the new virtual machine to authenticate the registration authority and securely receive new cryptographic material from the registration authority.

12. The method of claim 11, wherein the virtual machine is a service virtual machine and the new virtual machine is a client virtual machine, and wherein the cryptographic material and the new cryptographic material enable the client virtual machine to securely communicate with the service virtual machine.

13. The method of claim 8, further comprising retrieving an address of the registration authority and passing the address to the virtual machine after the computing resources boot up the virtual machine.

14. A system comprising:
    controller logic configured to:
    receive a request to instantiate a virtual machine based on a virtual machine image;
    determine an authentication credential for the virtual machine to authenticate only a registration authority, the registration authority providing cryptographic constructs;
    determine computing resources to run the virtual machine;
    instruct the computing resources to boot the virtual machine using the virtual machine image; and
    pass the authentication credential for the registration authority to the virtual machine; and
    one or more hardware processors configured to run the virtual machine and:
    receive the authentication credential from the controller logic;

authenticate the registration authority based on the authentication credential;

send a request for cryptographic constructs to the registration authority, the request comprising the authentication credential;

receive the cryptographic constructs securely from the registration authority; and establish a secure communications channel between the virtual machine and at least one of a plurality of other computing entities based on the cryptographic constructs.

15. The system of claim 14, wherein the virtual machine is a service virtual machine, further comprising:

a client virtual machine configured to communicate with the service virtual machine over the secure communications channel based on the cryptographic constructs, wherein the service virtual machine provides a service function to the client virtual machine over the secure communications channel.

16. The system of claim 14, wherein the cryptographic constructs comprise a digital certificate and a public/private key pair.

17. The system of claim 16, wherein the registration authority comprises an Enrollment over Secure Transport server and a certificate authority server that generates the digital certificate and the public/private key pair.

18. The system of claim 17, wherein a public certificate authority is chained to the registration authority.

19. The system of claim 14, wherein the request for cryptographic constructs is sent to the registration authority at an address that is registered with a domain name service with a well defined host name.

20. The system of claim 14, wherein the controller logic is further configured to pass an address of the registration authority to the virtual machine.

* * * * *